United States Patent Office 2,802,585
Patented Aug. 13, 1957

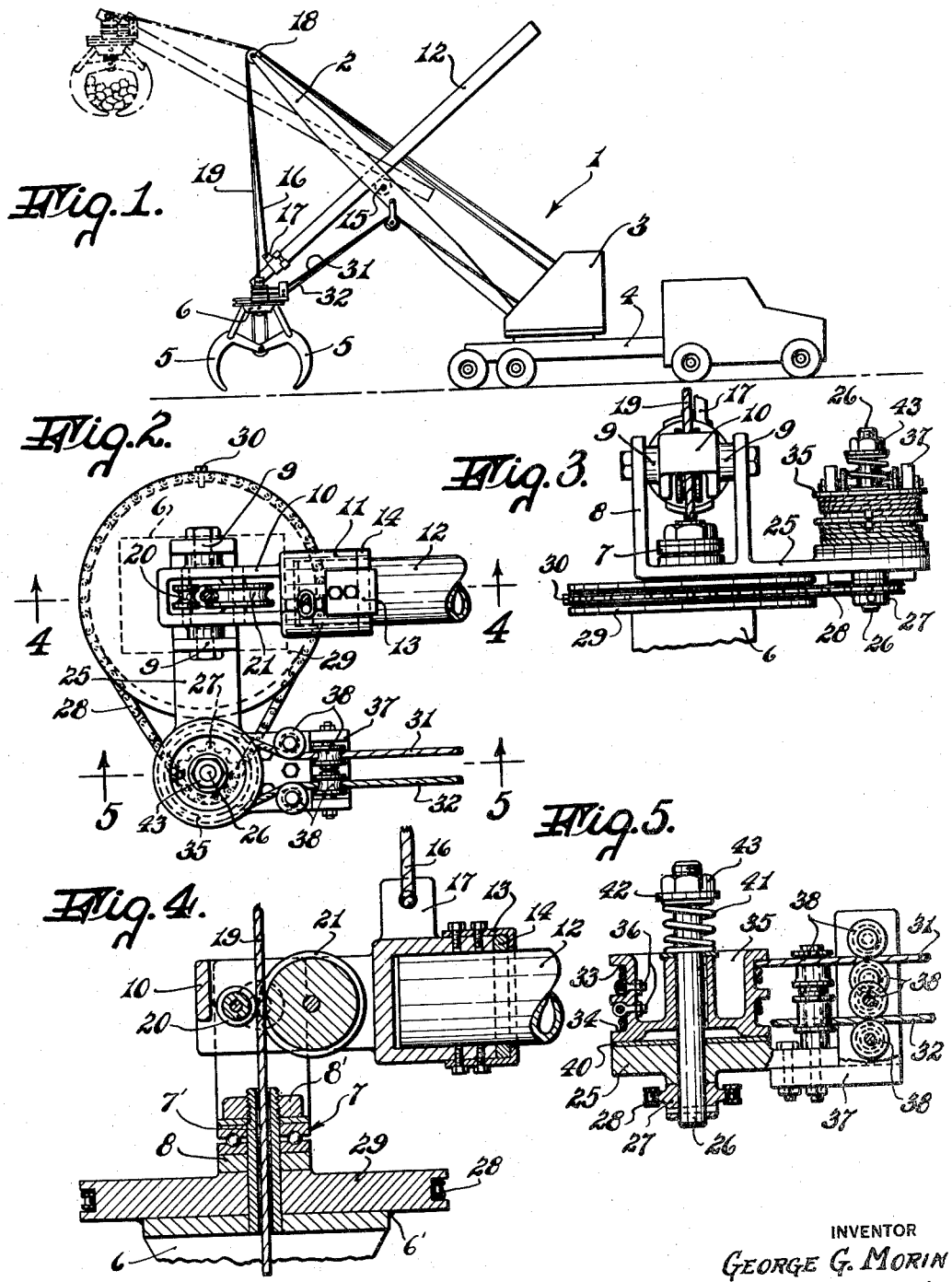

2,802,585

CONTROL MEANS FOR WOOD GRAPPLES AND THE LIKE

George G. Morin, South Hadley Falls, Mass., assignor to Morin Manufacturing Company, Incorporated, West Springfield, Mass.

Application October 22, 1953, Serial No. 387,752

1 Claim. (Cl. 214—147)

This invention relates to a device for controlling grapples and the like carried by power operated cranes and used in the handling of pulp logs and other materials.

A device of this character is disclosed in my prior Patent No. 2,577,689, issued December 4, 1951, and the present invention is in the nature of an improvement on the structure therein disclosed.

One object of the present invention is to provide a more exact and accurate control of the movement and position of the grapple.

Another object is to improve the facility with which a full load may be picked up, particularly under adverse conditions as in winter when the logs are frozen together.

A further object is to widen the field of use of the control means making it available for use with other forms of material handling means such as clam shell buckets, lifting magnets and other general or specialized material handing or grappling means.

Other and further objects and advantages will be made apparent in the disclosure of the accompanying drawings and in the following specification and claim.

In the accompanying drawings,

Fig. 1 is a side elevational view of a crane and log grapple embodying the invention;

Fig. 2 is a plan view, on a larger scale showing the control head of the grapple;

Fig. 3 is a side elevational view of the structure shown in Fig. 2;

Fig. 4 is a sectional view substantially on line 4—4 of Fig. 3; and

Fig. 5 is a sectional view substantially on line 5—5 of Fig. 4.

Referring to the drawings a power crane is generally indicated at 1. The crane boom 2 and its control cab 3 are mounted for rotative movement on the vehicle chains 4 in a usual manner. The toggle connected grapple arms 5 are carried by a support including a grapple head 6 welded as at 6' to a disc member 29, later described, rotatably connected as by ball bearing 7 to a U-shaped bracket 8. The arms of bracket 8 are pivoted at 9 to the sides of a rectangular frame member 10 extending from a cap head 11 swivelly mounted on the end of a beam 12 by means of L-shaped clamps 13 engaging over a collar 14 welded or otherwise secured to beam 12. The beam 12 is pivotally and reciprocably connected at 15 to the boom 2 in a manner entirely similar to the dipper stick of a power shovel and driven by the usual power plant (not shown) carried by the vehicle 4. The grapple is raised and lowered by means of a lifting or holding line 16 connected to a lug 17 extending from head 11 and extending over a double pulley 18, at the free end of boom 2, to the power plant of the vehicle. The grapple is actuated in the usual manner by a control line 19 extending axially through the head 6 of the support by way of tubular spindle 7' extending from head 6 and on which bearings 7 are mounted between bracket 8 and a nut 8', all as shown in Fig. 4, the line 19 passing over pulley 18 and to the control cab 3. The grapple line 19 is guided between pulleys 20 and 21 mounted in frame 10.

Bracket 8 is formed with a side extension 25 in which is journaled a vertical shaft 26. Fixed to the lower end of shaft 26 is a sprocket 27. A sprocket chain 28 engages around sprocket 27 and extends around a flanged disc or wheel member 29 fixed as previously described to the head 6, the ends of chain 28 being secured, as by a bolt 30 to the disc member 29 on the side remote from shaft 26 when the grapple is oriented as shown in Fig. 1. As will be apparent, rotation of shaft 26 will cause rotation of member 29, and the grapple head to which member 29 is secured, through arcs of substantially 90° in either direction.

Rotation is imparted to shaft 26 by taglines 31 and 32 which are respectively looped or snubbed around upper and lower grooves 33 and 34 formed in a pulley 35 keyed to the shaft. The outer ends of the taglines are secured to the pulley in their respective grooves by bolts 36 and extend to cab 3 where they are powered and controlled by means of slipping drives fully disclosed and described in my above-mentioned prior patent.

The taglines, as is apparent from Fig. 2, are wrapped around pulley 35 in opposite directions and therefore impart rotation to the pulley in opposite directions when one of the lines is taken in.

A bracket 37 fixed to bracket extension 25 carries a series of guide rolls or pulleys 38 around and between which the taglines pass so that they are maintained in proper relation to the pulley 35 and their respective grooves. From the pulleys 38 the taglines pass over a guide pulley 39 to the cab 3.

A friction disc 40 is secured in any suitable manner to bracket member 25. The under surface of pulley 35 rides on the friction disc 40 and is pressed against the disc by a spring 41 compressed between the upper surface of the pulley and a washer 42 held in place by a nut 43 threaded on the upper end of shaft 26. Turning of the pulley and consequently turning of the grapple head takes place against the restraining friction between pulley 35 and the friction disc 40.

When it is desired to orient the grapple with respect to a pile of logs the grapple may be turned around its vertical axis by applying power to one of the taglines to rotate the pulley 35 in the desired direction, in which case the power driven tagline overcomes the resistance of the friction disc 40 and the slipping drive of the other tagline to rotate pulley 35 and through chain 28 rotate disc 29 and the grapple head. The friction disc 40 prevents over rotation of the grapple when the power is released. After the load of logs has been picked up by the grapple and swung by suitable manipulation of the crane boom to its unloading position the grapple is re-oriented by again applying power to the proper tagline.

The beam 12 makes possible the manipulation and orientation of the grapple or other material handling means in all positions from a pick up position shown in full lines in Fig. 1 to an extreme unloading position as shown in dotted lines in said figure. The connection of head 6 to beam 12 by means of pivotal connection 9 and swivel connection 11 turning at right angles to pivot 9 provides an advantageous controlled manipulation of the grapple, since by turning the boom 2 and beam 12 to the right and left slightly and alternately or pushing the supporting beam 12 in and out alternatively the grapple may be worked into the wood pile, aided by the weight of the beam to secure a full and well distributed load. This type of manipulation is especially advantageous in winter when the logs are frozen together enabling the operator to pry the logs loose from the pile and separate them from each other.

The arrangement of the invention when used with a clamshell can be used for trench excavation and also to back fill a trench which is not possible with a conventional trench hoe.

With a magnet or other material handling device replacing the grapple steel, lumber or other materials may be handled, making it possible for the operator to orient the handling device quickly and accurately over the material to be lifted and to position and orient the load quickly and accurately over the car, truck or pile, where it is to be deposited, without outside help.

What is claimed is:

A control means for grapples, and the like, having opposed material handling members movable toward and from each other and adapted for use with a power crane of the type including a crane boom, a power driven beam pivotally and reciprocably carried by the boom for reciprocation in the plane of the boom, a lifting and holding line connected to the outer end of the beam, and a line for actuating the material handling members, said lines, beam and boom being independently operable, which comprises; a bracket, means for pivotally connecting said bracket to the outer end of said beam, a support for said material handling members, means connecting said support to said bracket for rotation relative thereto about a vertical axis, said last-named connecting means having an axial passage for the actuating line to the material handling members, and taglines for rotating said support, and the members carried thereby, about said vertical axis independently of and in all relative positions of movement of said lines, beam and boom, the said means connecting the bracket to the beam including a cap head swiveled on the adjacent end of the beam, and the bracket having a fork between the arms of which said cap head is pivoted, an arm extending sidewise from said fork, a shaft journaled in said arm for rotation by the taglines, and a chain and sprocket connection between said shaft and said support.

References Cited in the file of this patent
UNITED STATES PATENTS

| | | |
|---|---|---|
| 792,796 | Searfoss | June 20, 1905 |
| 1,327,324 | Hecker | Jan. 6, 1920 |
| 2,486,479 | Kennedy | Nov. 1, 1949 |
| 2,577,689 | Morin | Dec. 4, 1951 |
| 2,599,677 | Waguespack | June 10, 1952 |